United States Patent [19]
Matsuda et al.

[11] Patent Number: 5,200,755
[45] Date of Patent: Apr. 6, 1993

[54] BISTATIC RADAR SYSTEM

[75] Inventors: Shoji Matsuda; Masaya Takase, both of Amagasaki, Japan

[73] Assignee: Mitsubishi Denki Kabushiki Kaisha, Tokyo, Japan

[21] Appl. No.: 912,209

[22] Filed: Jul. 16, 1992

Related U.S. Application Data

[63] Continuation of Ser. No. 622,019, Dec. 4, 1990, abandoned.

[30] Foreign Application Priority Data

Dec. 6, 1989 [JP] Japan ................................. 1-318120

[51] Int. Cl.$^5$ ......................... G01S 13/48; H01Q 3/24
[52] U.S. Cl. .................................... 342/158; 342/372
[58] Field of Search ............................. 342/155–158, 342/368, 372, 445

[56] References Cited

U.S. PATENT DOCUMENTS 3,364,484 1/1968 Best .................................... 342/158
3,413,633 11/1968 Lehmann ........................... 342/158

FOREIGN PATENT DOCUMENTS 0167288 7/1988 Japan ................................... 342/445
2099256 12/1982 United Kingdom ................ 342/158

OTHER PUBLICATIONS

M. Skolnik, "Radar Handbook", 1970, 36–15.
E. Hanle, "Survey of Bistatic and Multistatic Radar", Dec. 1986.
H. Steyskal, "Digital Beamforming Antennas", Jan. 1987.
Hank, Eberhard, "Pulse Chasing with Bistatic Radar—Combined Space-Time Filtering", EUSIPCO, Erlangen, 1983, pp. 665–668.
Davies et al, "A High Resolution Radar Incorporating a Mechanical Scanning Transmitter and a Static Multi–Beam Receiver", Radar Conf., London, Eng. 1977.

Primary Examiner—Gilberto Barrón, Jr.

[57] ABSTRACT

A pulse chasing-type bistatic radar system is provided with a cluster of multiple narrow receive beams that covers the angle corresponding to the receive beam width required by the conventional pulse chasing mode, i.e., the required receive angle width, and scans in steps in accordance with the propagation of the transmit signals in the transmit beam. As the receive time-frame ends for the last narrow beam making up the cluster, it advances to a new position at the head of the cluster. Adopting this arrangement, the required number of receive beams can be reduced to the minimum.

9 Claims, 8 Drawing Sheets

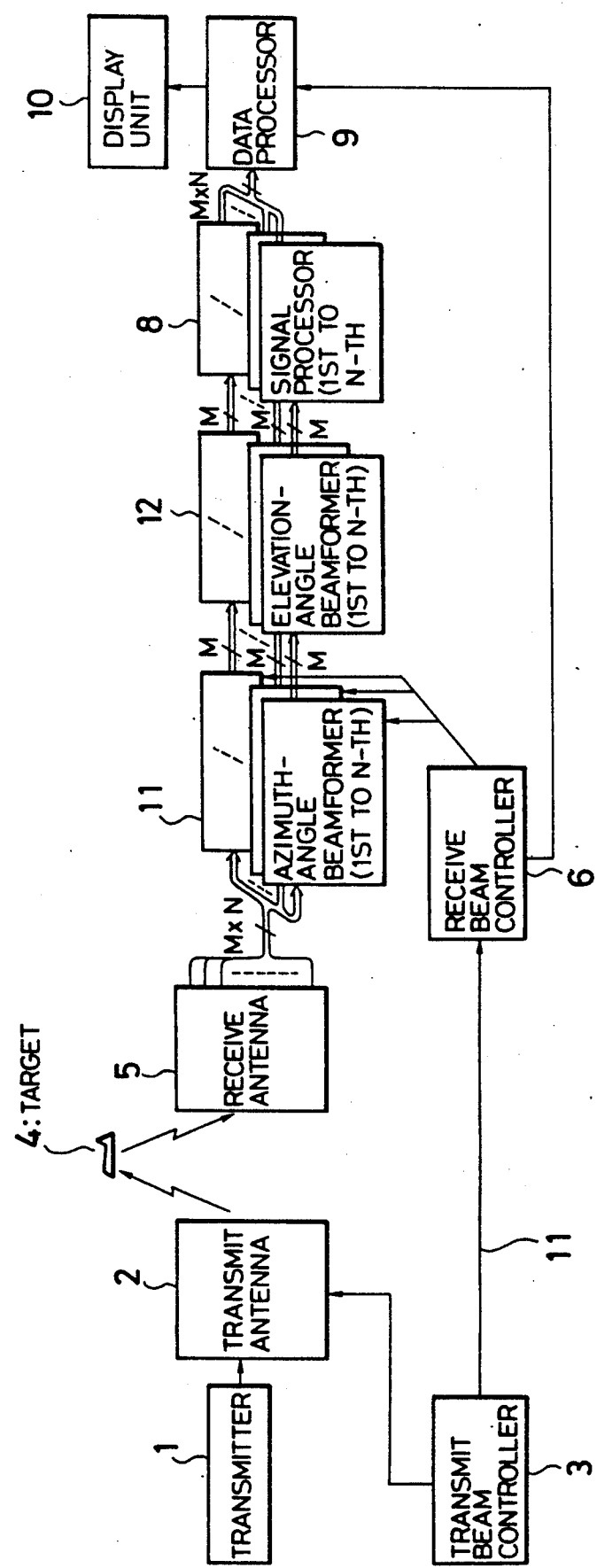

BISTATIC RADAR SYSTEM

This application is a continuation, of application Ser. No. 07/622,019 filed on Dec. 4, 1990, now abandoned.

FIELD OF THE INVENTION

This invention relates to ground-based, airborne, and shipborne radars for use in detecting target (aircraft, ships, or the like), and more particularly it relates to bistatic radar where the transmitter and receiver locations are separated.

BACKGROUND OF THE INVENTION

With bistatic radar systems, it is generally not possible to detect targets that are outside the area formed by the intersection of the transmit and the receive beams. Consideration must therefore be given to how radiating radar energy might most effectively utilize to search an area. One such approach is described by Merrill I. Skolnik in the "Radar Handbook" (McGraw Hill 1970), in which multiple receive beams are simultaneously formed so they cover the entire area illuminated by the transmit beam.

A shortcoming of this scheme, however, is that when the transmitter and receiver are separated by large distance or the surveillance area is extensive, many receive beams are needed, which increases the scale of the equipment to the point it becomes impractical.

A prior art approach to resolve this problem is known as "pulse chasing," as described for example by E. Hanle in a paper entitled "Survey of Bistatic and Multistatic Radar" (IEEE Proceedings, PP 592-594, Vol. 133, Part F, No. 7, 1986). In pulse chasing, the receiver is synchronized to the transmitter so that the receive beam scans rapidly tracking the propagation of radiated energy in the transmit beam.

Referring now to FIG. 5, the prior art configuration of the pulse chasing approach is illustrated.

The principal components of the configuration are a transmitter 1, a transmit antenna 2, a transmit beam controller 3 that produces the transmit beam scanning signal, containing data indicative of the time of transmission, and data indicative of the directional angle, a transmission path 11 for transmitting said transmit beam scanning signal, a receive antenna 5 comprising antenna elements for receiving signals reflected from a target 4, a receive beam controller 6 that produces the beam scanning signal required to scan the receive beam at high speed, in accordance with the transmitted scanning signal and an equation (1) to be set forth later, a digital beamformer 7 responsive to the receive beam scanning signal, for forming the desired receive beam by digitally synthesizing the signals received by the antenna elements of receive antenna, a signal processor 8 for pulse compression and Doppler processing, a data processor 9 that extracts the target information from the receive signal, detects the position (calculates the position coordinates), and performs tracking processing, and a display device 10.

Transmitter 1 located at the transmit station T provides an rf signal and sends it to transmit antenna 2, which causes the signal to be radiated into space in the desired direction. The beam formed at transmit antenna 2 successively scans the required surveillance region based on a beam scanning signal generated by beam controller 3. If the transmit beam illuminates target 4, then reflected energy is sent back to receive antenna 5 at the receive station R. In synchronization with the propagation of the transmit signal, the receive beam rapidly scans across the area illuminated by the transmit beam, as shown in FIG. 6. The scan rate of the receive beam is given by $$-\frac{\delta\phi_R}{\delta t} = \frac{c[1 - \cos(\phi_R - \phi_T)]}{b\sin\phi_T} \quad (1)$$

where $-\delta\phi_R/\delta t$ is the scanning angular velocity of the receive beam, c is the speed of light, b is the distance separating transmit station T and receive station R, $\phi_T$ is the angle formed by the baseline $\overline{TR}$ connecting transmit and receive stations T and R, and the transmit beam, and similarly, $\phi_R$ is the angle formed by the baseline $\overline{TR}$ and the receive beam. It will be apparent from equation (1) that the scanning rate of the receive beam is dependent on the directional angle $\phi_T$ of the transmit beam. The scan process is coordinated by sending the transmit beam scanning signal, containing the data indicative of the time of transmission, and the data indicative of the directional angle $\phi_T$, produced by transmit beam controller 3 at the transmit station to the receive beam controller 6 at the receive station R, where the receive beam scanning signal is produced in accordance with the transmit beam scanning signal and the equation (1). Based on this scanning signal, digital beamformer 7 forms the desired receive beam by digitally integrating the signals received by the constituent elements of receive antenna 5.

The principles of a digital beamformer are generally known by those acquainted with the art, and is therefore omitted here. A good summary treatment of the subject can be found in the article "Digital Beamforming Antennas, An Introduction" (Microwave Journal, PP 107-124, January 1987). by H. Steyskal.

Once it is received as described above, the receive beam scanning signal undergoes necessary processing by signal processor 8 including pulse compression and ranging processing, as well as Doppler processing to suppress clutter, which includes moving target indication, and pulse-Doppler processing. After that, data processor 9 performs target signal extraction, position detection, and tracking processing. For the position detection, receive beam directional angle information from the receive beam controller 6 is generally employed in addition to the ranging processing results. The results of the processing are then shown on display device 10.

Since only one receive beam is employed in this prior art configuration, a fairly broad beamwidth must be employed to assure that none of the area illuminated by the transmit beam is missed. We will now consider this situation in more detail, making reference to FIGS. 7 and 8.

The first constraint affecting the width of the receive beam is the width of the transmit beam. As shown in FIG. 7, the set of target positions with the signals reflected therefrom being received at the receive station R at one time is on an ellipse whose foci are the transmit and the receive stations. If the transmit beam cuts across this ellipse from points A to B, then the width of the receive beam must be broad enough to cover any prospective angle formed by these two points. Taking this constraint into account, the minimum width $\theta_{R1}$ of the receive beam is given by $$\theta_{R1} = \theta_T \cdot \frac{\sin\phi_R}{\sin\phi_T} \quad (2)$$

where $\theta_T$ is the transmit beam width, $\phi_T$ is the angle formed by the baseline connecting transmit and receive stations and the transmit beam, and $\phi_R$ is the angle formed by the baseline and the receive beam. It is clear from equation (2) that the width of the receive beam must increase in proportion to that of the transmit beam.

The second constraint on the width of the receive beam is the width of the transmit pulse. FIG. 8A shows a schematic diagram of the relationship between the transmit and receive beams, and FIG. 8B shows a timing chart of the receive signals. Assume that signals $P_A$ emitted from transmitter T and reflected from target A begin to reach receive station R at time $t_A$. If transmission begins at time $t=0$, then adopting the symbol employed in FIG. 8A, $t_A$ is derived as follows:

$$t_A = \frac{\overline{TA} + \overline{RA}}{c} \quad (3)$$

where c is the speed of light. $\overline{TA}$ is the distance from the transmit station T to the target A, and $\overline{RA}$ is the distance from the target A to the receive station R.

Now if we let $\tau$ represent the transmit pulse width (or the transmit frame-time in the case of CW radar), then signal $P_A$ reflected from target A is received in the time-frame $t_A$ to $(t_A+\tau)$. The receive beam must therefore illuminate target A during this time frame. Next, we consider target B detected by the same transmit beam at the position $$\overline{TB} + \overline{RB} = \overline{TA} + \overline{RA} + c\tau \quad (4)$$

Referring again to FIG. 8B, since signal $P_B$ reflected from target B is received during the time-frame $t_B$ to $(t_B+\tau)$, it is apparent the receive beam must begin illuminating target B at time $t_B$. Now, since we can derive $$t_B = \frac{\overline{TB} + \overline{RB}}{c} = t_A + \tau \quad (5)$$

from equation (4), it is apparent that the receive beam must illuminate both targets A and B simultaneously at time $t_A + \tau \ (=t_B)$.

Expressing the relationship more formally, the required width of the receive beam $\theta_{R2}$ is given by $$\theta_{R2} = \frac{c\tau[1 - \cos(\phi_R - \phi_T)]}{b\sin\phi_T} \quad (6)$$

Equation (6) reveals that the longer the transmit beam's pulse width $\tau$, the broader the width of the receive beam must be made.

We can represent the width of a receive beam $\theta_R$ that would satisfy both constraints discussed above as follows:

$$\theta_R = \max(\theta_{R1}, \theta_{R2}) \quad (7)$$

From this it is apparent that when the transmit beam has a broad width, or when the transmit pulse width or transmit time-frame is long, then the beamwidth of the receive beam must also be made correspondingly broad.

While for convenience we have assumed that transmit antenna 2 for electronic scanning is a phased array antenna, it will be apparent to those familiar with the art that the antenna could just as easily be implemented with mechanical beam scanning, in which case transmit beam controller 3 would be replaced by a beam directional angle detector. Similarly, receive antenna 5 has been described as a digital beamforming antenna that works in conjunction with digital beamformer 7, but it could just as readily be implemented as a phased array antenna featuring electronic scanning through phase control over each antenna element.

From this description of the prior art bistatic radar configuration, it is clear that the width of the receive beam must be broad if the width of the transmit beam is wide, or if the transmit pulse (in the case of pulse radar) or frame-time (in the case of CW radar) is long. Various problems are associated with a broad receive beam: the detection range is reduced, the target resolution and position accuracy are diminished, and the radar is more susceptible to clutter and other kinds of interference.

SUMMARY OF THE INVENTION

The present invention overcomes these shortcomings of the prior art bistatic radar configuration to permit the width of receive beams to be sharply narrowed irrespective of the transmit beamwidth or the transmit pulse width (or transmit frame-time). What is more, the present invention allows bistatic radar systems to be implemented with the minimum number of receive beams required to scan the entire surveillance region.

A bistatic radar system configured in accordance with the present invention is provided with a cluster of multiple narrow receive beams that covers the angle corresponding to the receive beam width required by the conventional pulse chasing mode. The above-mentioned cluster of beams scans across the surveillance area in steps in accordance with the propagation of the transmit signals in the transmit beam.

In the present invention, the receive beam covering the required receive angle comprises a cluster of multiple beams that individually are narrow. Then, as the receive timeframe ends for the last narrow beam making up the cluster, it advances to a new position at the head of the cluster. Adopting this arrangement, the required number of receive beams can be reduced to a minimum.

BRIEF DESCRIPTION OF THE DRAWINGS

FIG. 3 is a schematic diagram showing a bistatic radar system of a second embodiment of the invention.

DETAILED DESCRIPTION OF THE PREFERRED EMBODIMENTS

Figure 1:
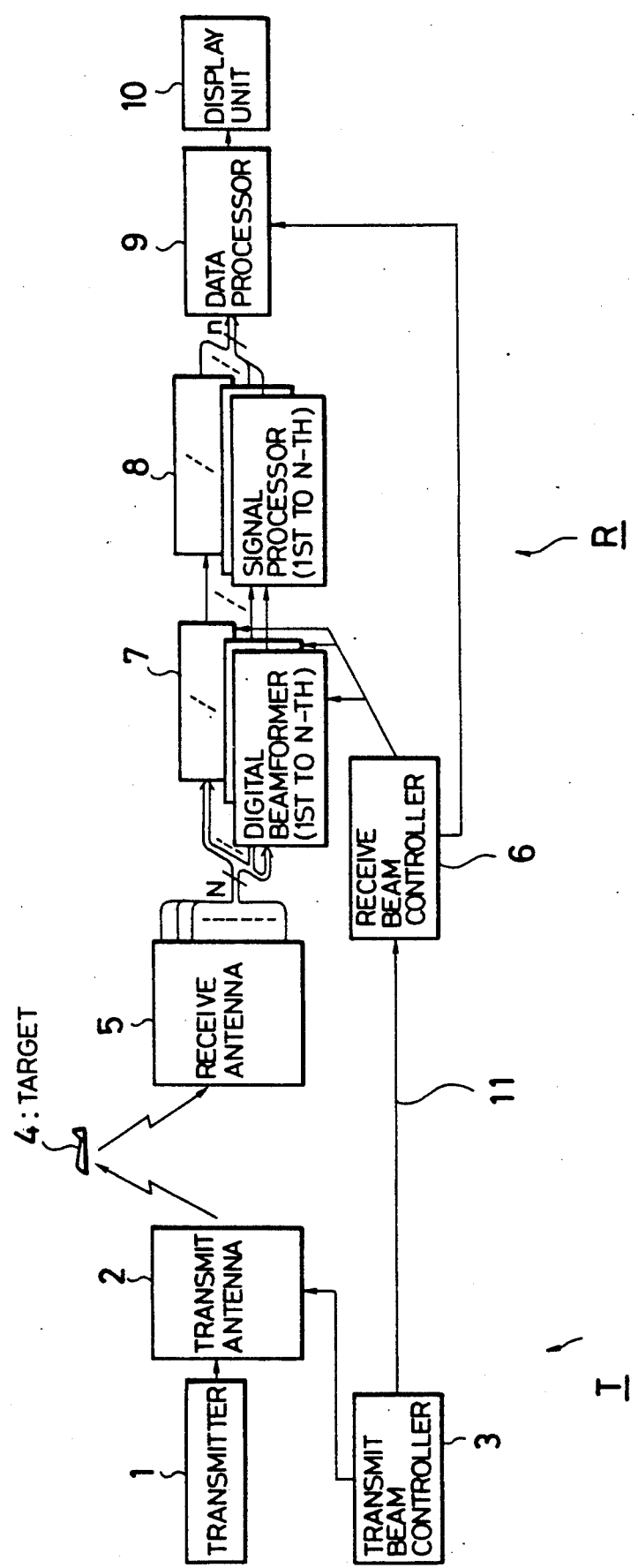
FIG. 1 is a schematic diagram showing a bistatic radar system of a first embodiment of the invention.

Features of the invention will become apparent through description of the embodiments shown in the drawings.

Referring to FIG. 1, there is shown an embodiment of a bistatic radar system in which pencil beams are employed for both the transmit and receive beams. The principal components of the illustrated configuration are a transmitter 1, a transmit antenna 2, a transmit beam controller 3 that produces the transmit beam scanning signal, containing the data indicative of the time of transmission, and the data indicative of the directional angle, a transmission path 11 for transmitting the transmit beam scanning signal from the transmit station T to the receive station R, a receive antenna 5 comprising antenna elements for receiving signals reflected from a target 4, and a receive beam controller 6 that produces the beam scanning signal required to scan the receive beam at high speed, in accordance with the transmitted scanning signal and the equation (1). The receive beam controller 6 produces the beam scanning signal that controls sequential scanning of a plurality of, i.e., N, receive beams. A set of N digital beamformers 7 are responsive to the receive beam scanning signal, for forming the desired receive beam by digitally integrating the signals received by the antenna elements of receive antenna. A set of N signal processors 8 perform for pulse compression and Doppler processing. A data processor 9 extracts the target information from the receive signal, detects the position (calculates the position coordinates), and performs tracking processing. A display device 10 displays the results of the processing by the data processor 9.

Figure 6:
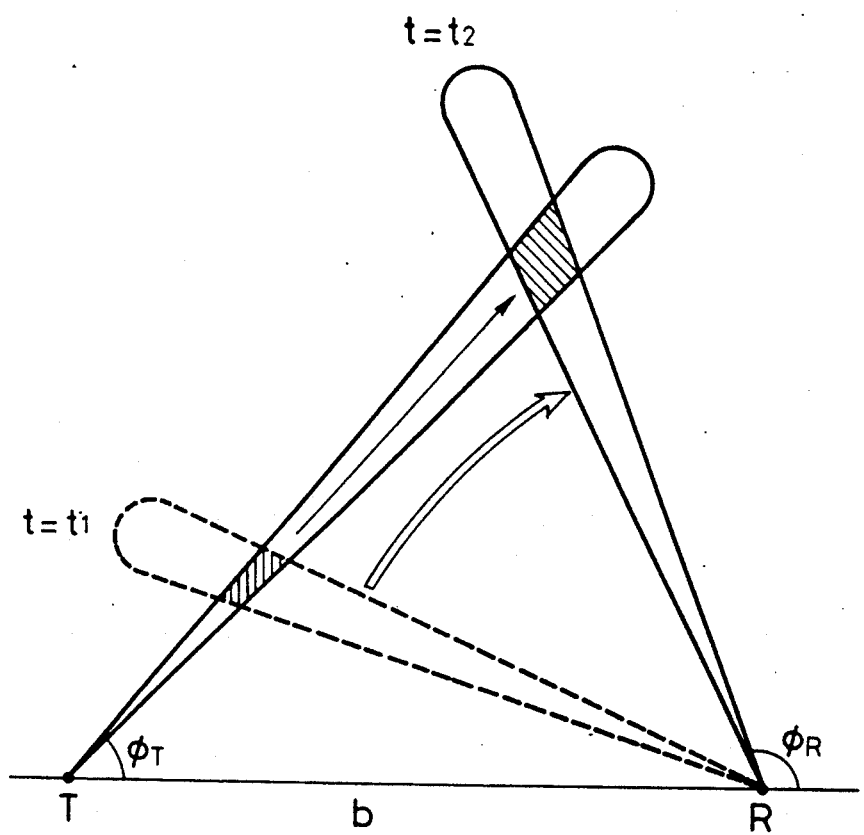
FIG. 6 is a diagram for explaining the operation of the system of FIG. 5.
Figure 7:
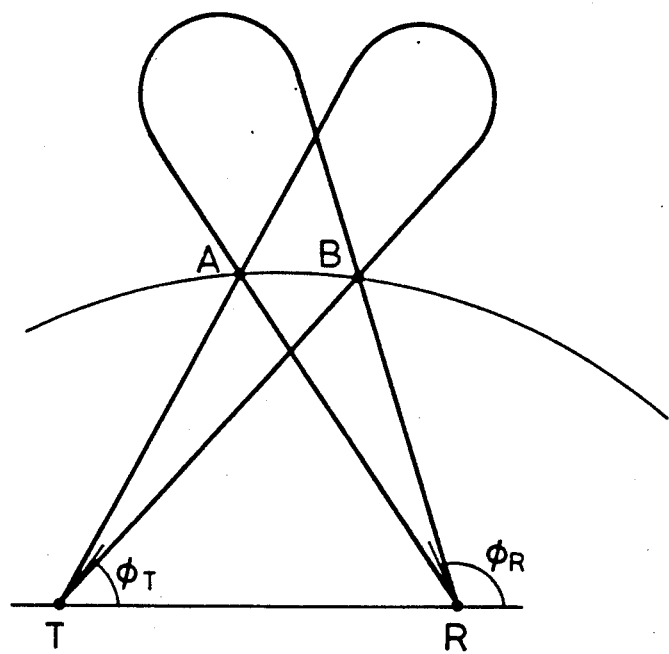
FIG. 7, FIG. 8A and FIG. 8B are diagrams for explaining the required width of the receive beam.
Figure 8A:
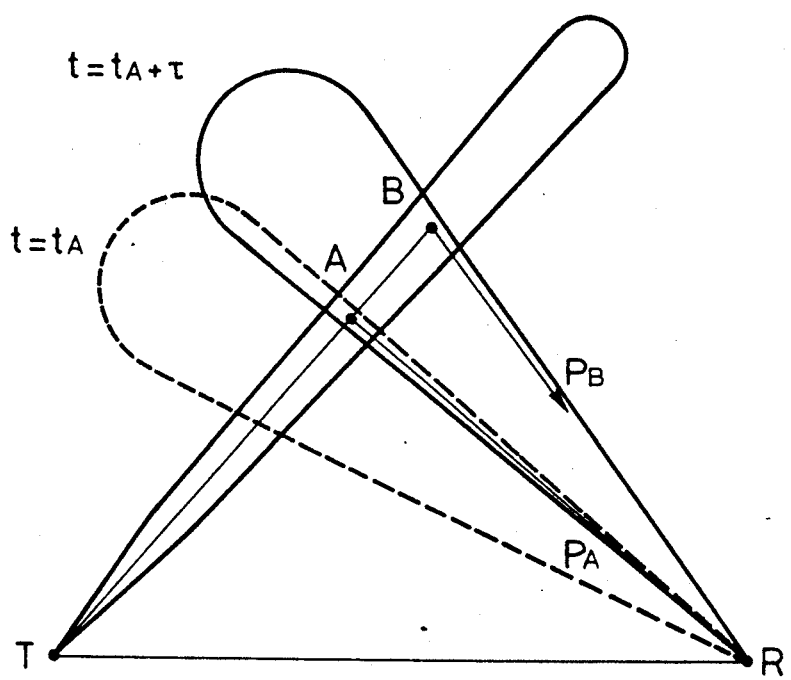
Figure 8B:
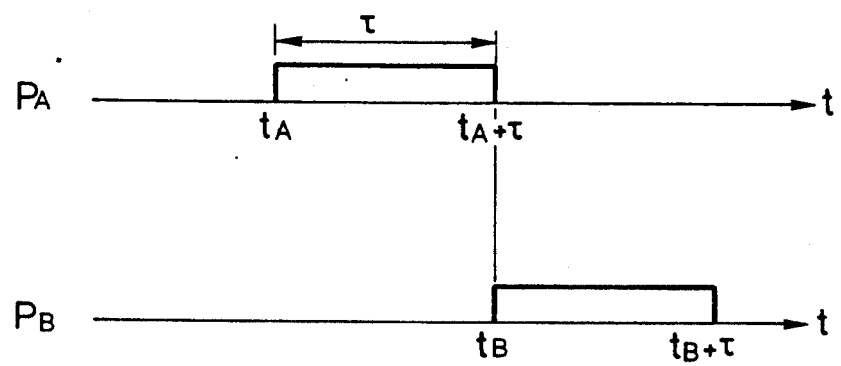

Transmitter 1 located at the transmit station T provides an rf signal and sends it to transmit antenna 2, which causes the signal to be radiated into space in the desired direction. The beam formed at transmit antenna 2 successively scans the required surveillance region based on a beam scanning signal generated by beam controller 3. If the transmit beam illuminates target 4, then reflected energy is sent back to receive antenna 5 at the receive station. Echoes from target 4 are observed by receive antenna 5 at the receive station. Meanwhile, in synchronization with the propagation of the transmit signal, the receive beam rapidly scans across the area illuminated by the transmit beam, as shown in FIG. 6. The scanning rate of the receive beam is given by the equation (1). The receive beam consists of multiple narrow beams covering the necessary receive angle area $\theta_R$ as determined by equation (7). More specifically, the cluster of receive beams comprises a plurality of pencil beams which are adjacent each other, and each of the receive beams does not overlap with adjacent receive beam. Then, in accordance with the propagation of the transmit beam, the narrow beams in the cluster jump, one at a time, to new positions at the head of the cluster. This arrangement is shown schematically in FIG. 2A and FIG. 2B.

For purposes of simplification, a 3-beam configuration is shown, where the beamwidth is $\theta_R/2$, and the pulse width $\tau$ is long such that $$\theta_R = \theta_{R2} \quad (8)$$

Figure 2A:
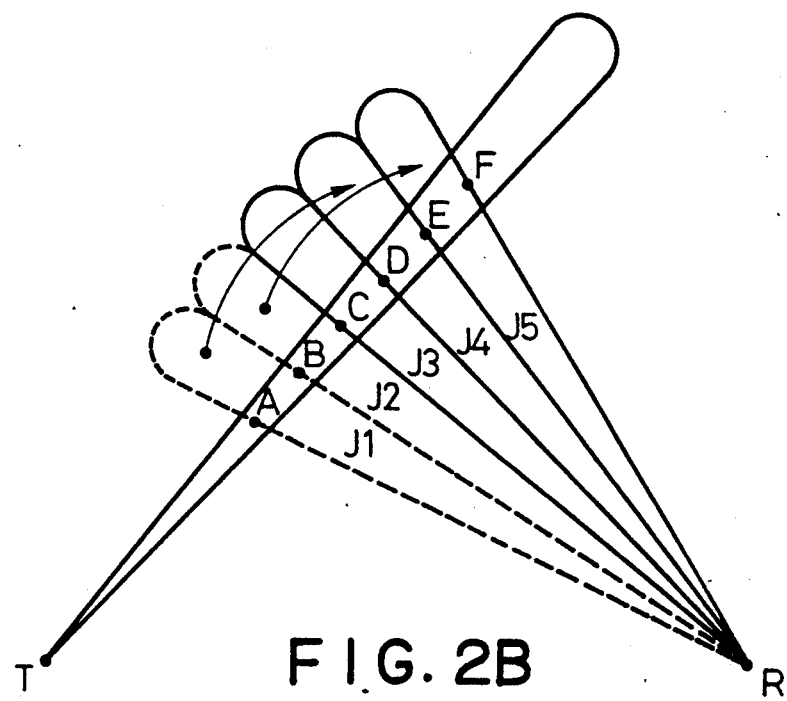
FIG. 2A and FIG. 2B are diagrams for explaining the operation of the system of FIG. 1.
Figure 2B:
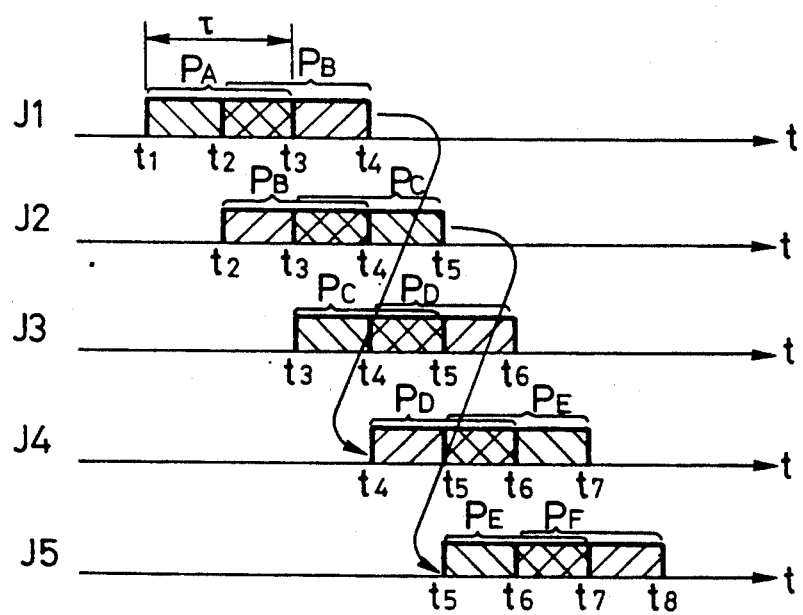

Referring to FIG. 2A, signals in the transmit beam reflected back from points A, B, C, D, E, and F are received at times $t_1, t_2, t_3, t_4, t_5,$ and $t_6$, respectively. Beam J1 receives signals that cover the area from point A to point B during time-frame $t_1$ to $t_4$. In the same way, beams J2 and J3 receive signals from points B to C and from C to D during time intervals $t_2$ to $t_5$ and $t_3$ to $t_6$, respectively. It will be observed, that once time $t_4$ is reached, the time-frame for beam J1 has ended, so it jumps to the beam J4 position, where it receives signals from the area between points D and E. This beam recycling continues in sequence so, when time $t_5$ is reached, beam J2 switches to the position of beam J5, and so on. It will be observed that if the beams are switched at time intervals of $\tau/2$, then the entire surveillance area can be searched with this 3-beam cluster.

Note that while this example shows a 3-beam arrangement, in a general implementation where N multiple beams are employed, the width of each constituent pencil beam $\theta_r$ could be narrowed to roughly $1/(N-1)$ as apparent from the following $$\theta_r = \frac{\theta_R}{N-1} + \alpha \quad (9)$$

where $\alpha$ is the angle corresponding to the delay time due to switching between beams.

It will also be observed that while FIG. 2 represents the case where $\theta_R = \theta_{R2}$, the principles are in no way different for the case where $\theta_R = \theta_{R1}$, and $\theta_R$ is allocated among multiple beams capable of searching the entire receive beam area.

Through the process sketched above, receive beam controller 6 in FIG. 1 controls the scheduling of the receive beam cluster, and outputs a directional angle signal to N digital beamformers 7. Based on this signal, beamformer 7 forms N multiple beams. The receiving signal of each beam is processed by the corresponding signal processor 8 and data processor processor 9, and after the required target extraction, position finding, and tracking, the information is presented on a display device 10.

The present embodiment described herein permits the width of the receive beam to be narrowed without being restricted in any way by the transmit beam width or transmit pulse width.

It will also be apparent to those skilled in the art that, while the present embodiment employs pencil beams for both transmitting and receiving, identical principles are involved and the same advantages would be realized using a fan beam. For example, if fan beams with broad elevation beam width were adopted for both transmit and receive beams, the FIG. 2 could be conceived as a plan sectional view showing a cross section along a horizontal plane of these beams.

A second preferred embodiment of the present invention now be described with reference to FIG. 3.

In this embodiment, the transmit beam is a fan beam with broad elevation beam width and the receive beam consists of multiple pencil beams. Aside from the fact the transmit beam is a fan beam, transmitter 1 at the transmit station, transmit antenna 2, and transmit beam controller 3 all operate exactly the same as in the first embodiment.

Figure 4:
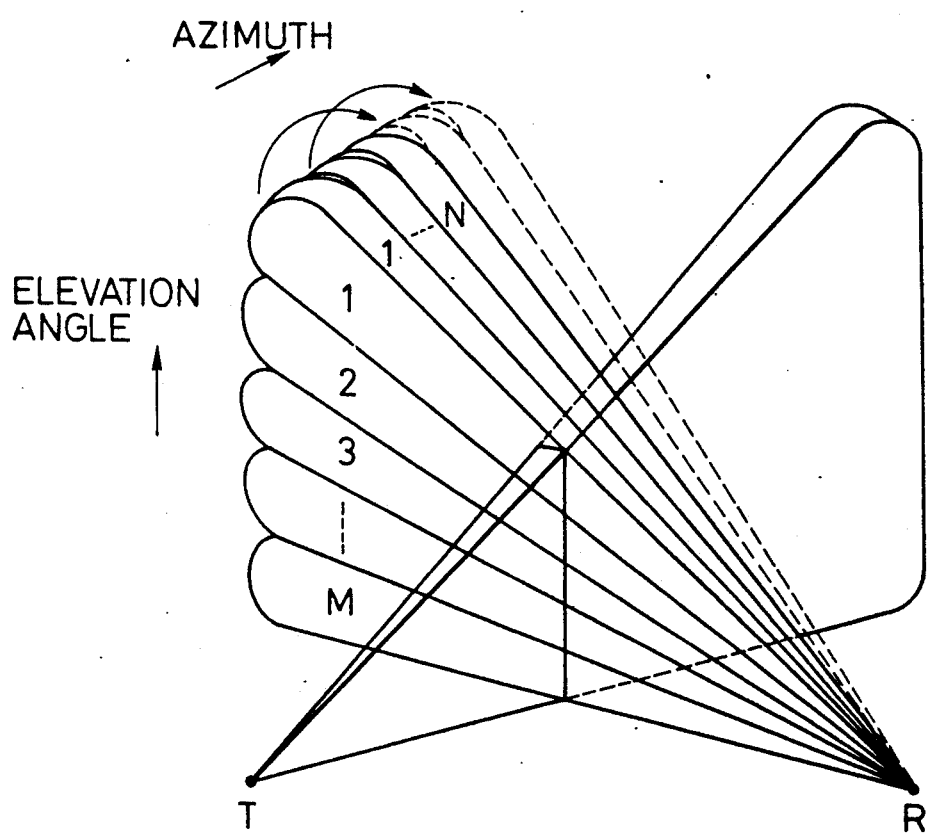
FIG. 4 is a diagram for explaining the operation of the system of FIG. 3.
Figure 5:
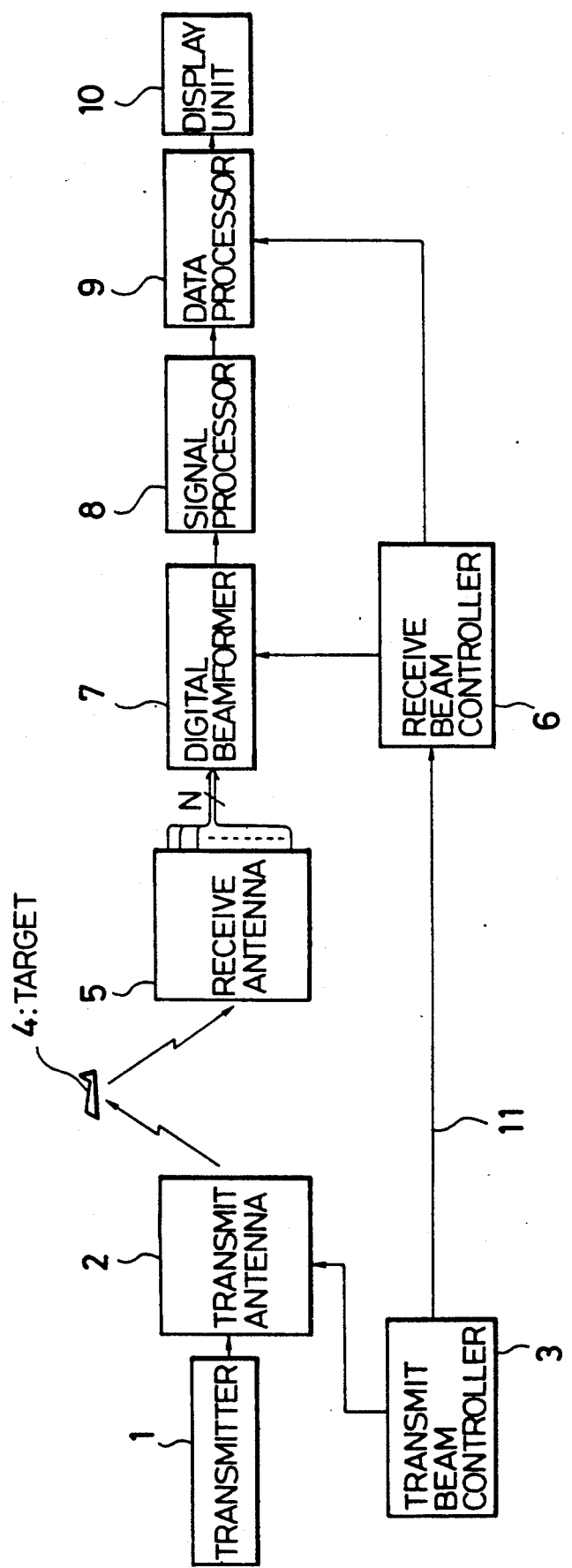
FIG. 5 is a schematic diagram showing a bistatic radar system in the prior art.

Now turning to the operation of this embodiment, echoes from target 4 are observed by the receive antenna at the receive station R. Referring to FIG. 4, it can be seen that the receive beam pointing at the elevation angle consists of M fixed multiple beams to cover the necessary elevation angle. In the azimuth direction, the operation works essentially the same as the first embodiment; that is, in accordance with the propagation of transmit signals, N pencil beams scan by sequentially switching to the front of the cluster. This means the beamformer must be implemented in a divided configuration that is split between the azimuth angle and the elevation angle. The azimuth-angle beamformer 11 integrates N beams in the azimuth direction based on the azimuth scanning signal from receive beam controller 6. Meanwhile, elevation-angle beamformer 12 integrates M beams in the direction of the angle of elevation. This means that (M×N) multiple beams are formed at any given moment in time. Once the beams are formed, the subsequent operations of signal processor 8, data processor 9, and display device 10 are identical to those of the first embodiment.

With this configuration, narrow receive beams can be employed even though the transmit beam is a fan beam, and the entire area of the transmit beam can be searched with the minimum required number of receive beams.

Note that while the embodiments discussed so far have assumed an electronic scan type phased array antenna for transmitting, it should be apparent to anyone knowledgeable in the art, that the same advantageous effects would be realized if the beam scanning were done mechanically.

It will also be observed that the number of beams, N, need not be fixed. For example, the smaller the prospective difference between the transmitter-to-target angle $\theta_T$ and the receiver-to-target angle $\theta_R$ (i.e., the farther the distance out to the target), the further the number of beams can be reduced.

Implementing the present invention, a bistatic radar system can be configured in which multiple narrow receive beams making up a cluster successively scan the receive angle in synchronization with the propagation of transmit signal. Utilizing narrow pencil beams for receiving, the detection range can be extended, the resolution and position accuracy enhanced, and clutter suppressed. Moreover, since the minimum required number of receive beams are implemented, the equipment can be realized much more compactly than otherwise possible.

What is claimed is:

1. A bistatic radar system comprising:
   a transmit station having an antenna for transmitting a transmit beam; and
   a receive station separate from the transmit station for forming a cluster of receive beams, intersecting the transmit beam;
   said receive station performing step-wise shifting, wherein each of said receive beams is step-wise shifted in a direction of propagation of the transmit beam such that a last beam of said receive beams in the direction of propagation of the transmit beam becomes a first beam of said receive beams in the direction of propagation of the transmit beam upon termination of a predetermined time period for each of said receive beams.

2. The system of claim 1, wherein said transmit beam is a pencil beam or a fan beam.

3. The system of claim 1, further comprising:
   a transmit beam controller generating a transmit beam scanning signal; and
   a transmit antenna for forming said transmit beam such that said transmit beam successively scans a surveillance region of interest in accordance with the transmit beam scanning signal.

4. The system of claim 1, wherein said cluster of receive beams are pencil beams or fan beams.

5. The system of claim 1, wherein said receive station includes a receiver which is synchronized with said transmit station so that said cluster of receive beams scan the radiated energy in the transmit beam.

6. The system of claim 1, wherein:
   said receive station further includes a receive beam controller that produces a receive beam scanning signal required to scan the surveillance region of interest; and
   said receiver is responsive to said receive beam scanning signal for performing the scanning.

7. The system of claim 1, wherein:
   said transmit station further includes,
   a transmit beam controller for producing a transmit beam scanning signal, containing data indicative of the time of transmission, and data indicative of the directional angle, and transmitting said transmit beam scanning signal; and
   said receive station includes,
   a receive antenna including antenna elements for receiving signals reflected off a target;
   a receive beam controller for producing a receive beam scanning signal in accordance with the transmit beam scanning signal; and
   a digital beamformer responsive to the receive beam scanning signal, for forming a desired receive beam by digitally integrating the signals received by all the antenna elements of said receive antenna.

8. The system of claim 1, wherein said cluster of receive beams comprises N receive pencil beams which are adjacent each other, each of which has a width of $\theta_R/(n-1)$, wherein $\theta_R$ represents the necessary receive angle area.

9. The system of claim 8, wherein none of said receive pencil beams overlap with adjacent receive pencil beams.

* * * * *